(12) United States Patent
Runions

(10) Patent No.: US 6,240,996 B1
(45) Date of Patent: Jun. 5, 2001

(54) REAR WINDOW SCREEN ASSEMBLY FOR TRUCKS

(76) Inventor: Gerald L. Runions, 4931 Starr Ave., Lansing, MI (US) 48910

( * ) Notice: Subject to any disclaimer, the term of this patent is extended or adjusted under 35 U.S.C. 154(b) by 0 days.

(21) Appl. No.: 09/586,023

(22) Filed: Jun. 2, 2000

(51) Int. Cl.[7] .................................................. E06B 3/32
(52) U.S. Cl. .......................... 160/105; 160/371; 296/152
(58) Field of Search .................................. 160/105, 106, 160/371, 370.21, 96; 296/152

(56) References Cited

U.S. PATENT DOCUMENTS

| | | | |
|---|---|---|---|
| 885,725 | * | 4/1908 | Conklin . |
| 1,128,815 | * | 2/1915 | Oesterla . |
| 1,496,594 | * | 6/1924 | Otto . |
| 1,700,501 | * | 1/1929 | Levan . |
| 1,709,574 | * | 4/1929 | Hendrix . |
| 1,795,294 | * | 3/1931 | Collins . |
| 1,863,428 | * | 6/1932 | Westrick . |
| 3,422,876 | * | 1/1969 | Fester . |
| 4,936,368 | * | 6/1990 | Philbeck et al. . |
| 5,469,906 | * | 11/1995 | Cason . |
| 6,016,861 | * | 1/2000 | Davis . |

* cited by examiner

Primary Examiner—Blair M. Johnson

(57) ABSTRACT

A rear window screen assembly for trucks for preventing debris from entering through an open rear window. The rear window screen assembly for trucks includes a mesh screen with a frame and at least one spring member coupled to a lower edge of the frame. Each spring member is adapted for being inserted into a lower track of a window opening such that the spring member urges the frame upward. An upper edge of the frame is adapted for insertion into an upper track of the window opening whereby said frame is couplable to the window opening.

18 Claims, 3 Drawing Sheets

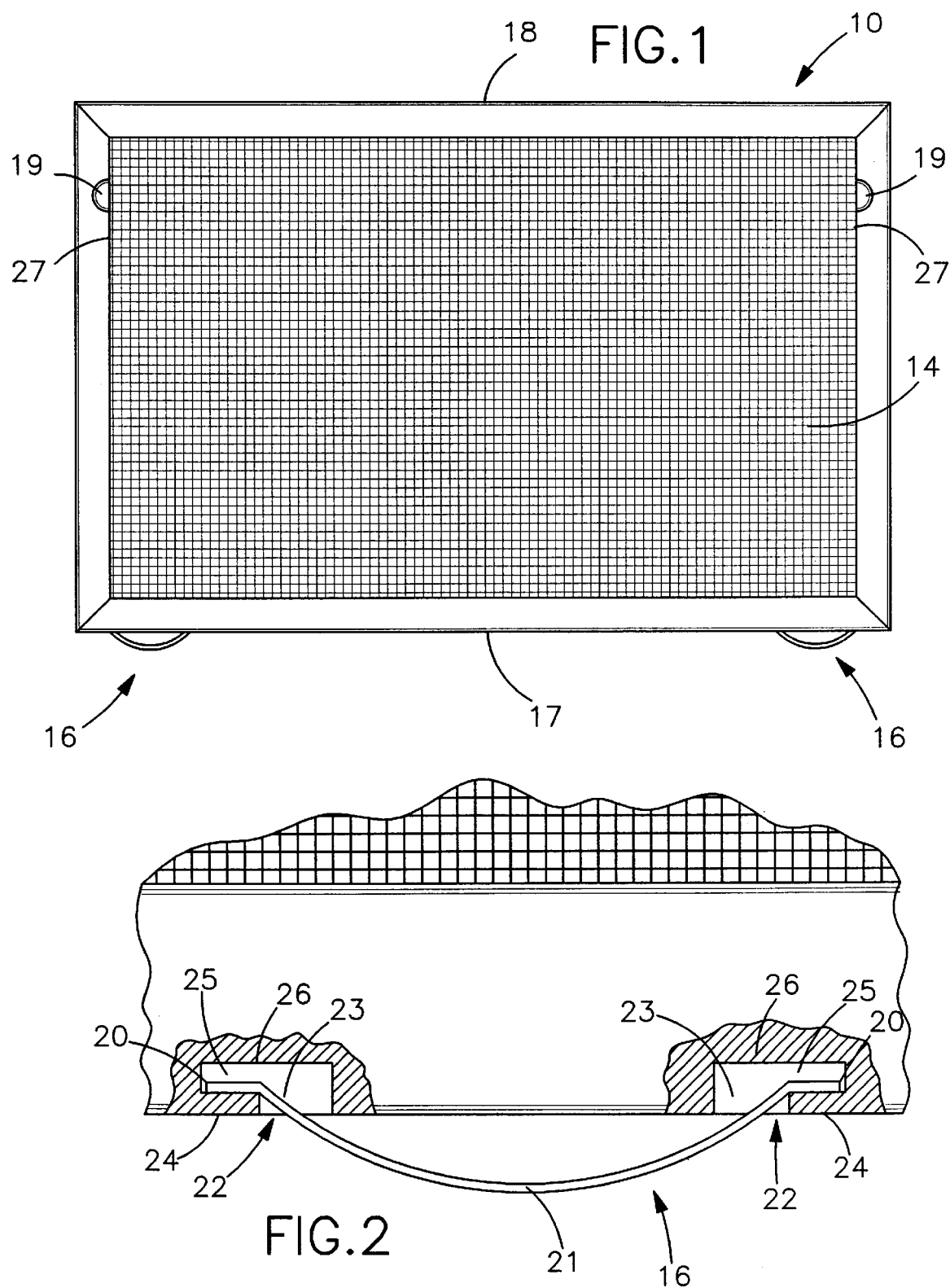

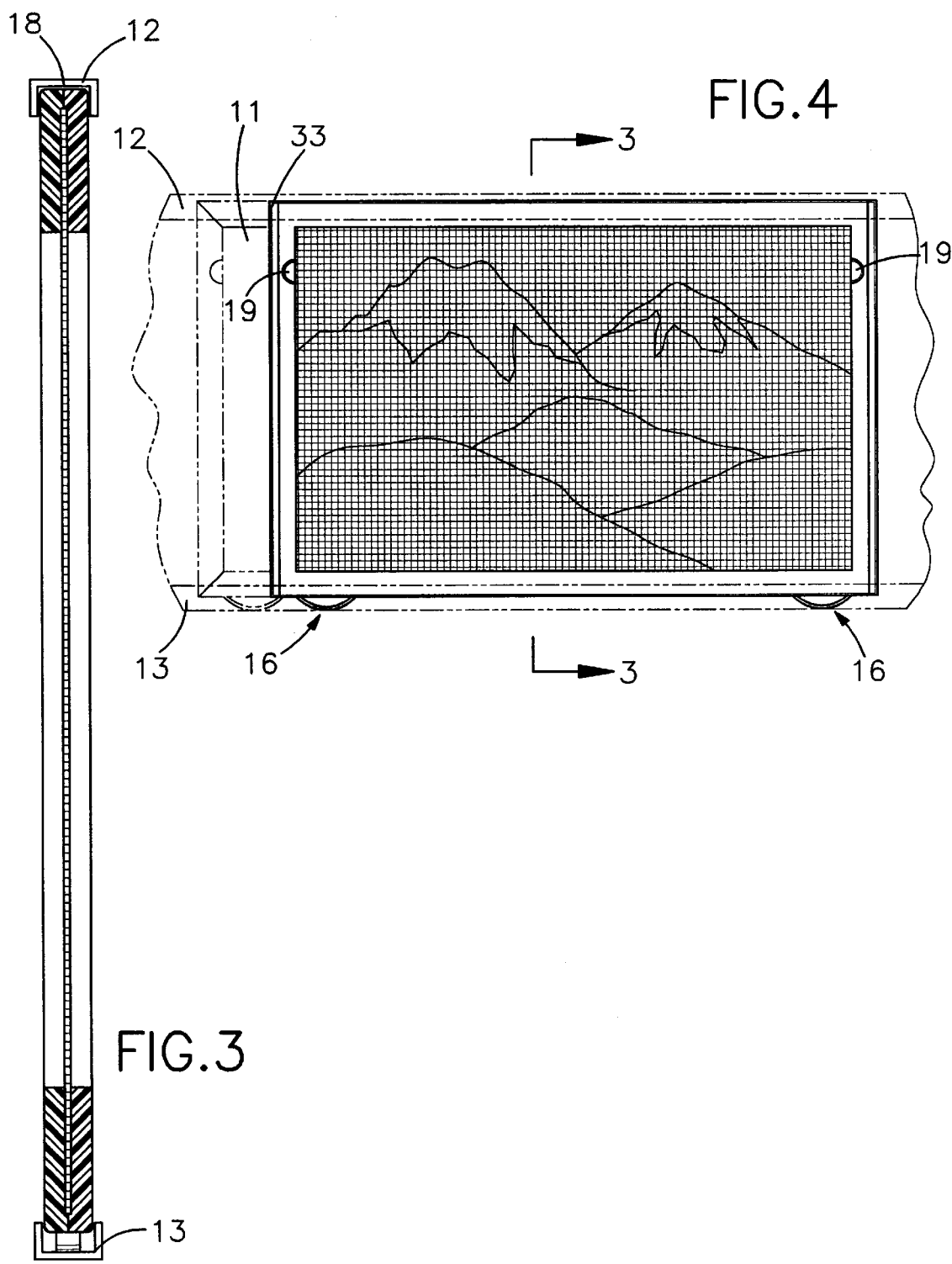

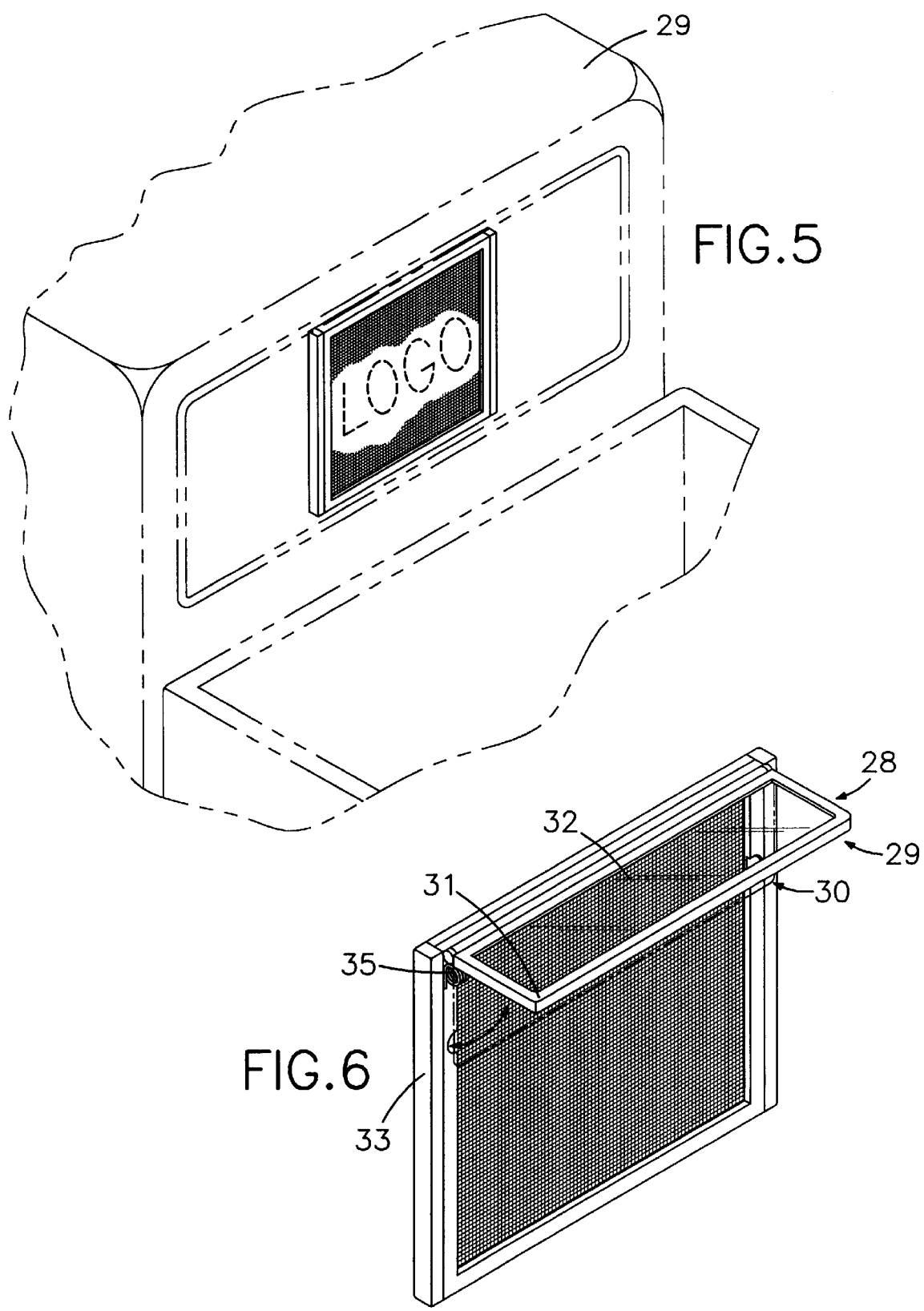

REAR WINDOW SCREEN ASSEMBLY FOR TRUCKS

BACKGROUND OF THE INVENTION

1. Field of the Invention

The present invention relates to window screens and more particularly pertains to a new rear window screen assembly for trucks for preventing debris from entering through an open rear window.

2. Description of the Prior Art

The use of window screens is known in the prior art. More specifically, window screens heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,469,906; U.S. Pat. No. 4,913,212; U.S. Pat. No. 3,064,725; U.S. Pat. No. 1,753,866.

While these devices fulfill their respective, particular objectives and requirements, the aforementioned patents do not disclose a new rear window screen assembly for trucks. The inventive device includes a mesh screen with a frame and at least one spring member coupled to a lower edge of the frame. Each spring member is adapted for being inserted into a lower track of a window opening such that the spring member urges the frame upward. An upper edge of the frame is adapted for insertion into an upper track of the window opening whereby said frame is couplable to the window opening.

In these respects, the rear window screen assembly for trucks according to the present invention substantially departs from the conventional concepts and designs of the prior art, and in so doing provides an apparatus primarily developed for the purpose of preventing debris from entering through an open rear window.

SUMMARY OF THE INVENTION

In view of the foregoing disadvantages inherent in the known types of window screens now present in the prior art, the present invention provides a new rear window screen assembly for trucks construction wherein the same can be utilized for preventing debris from entering through an open rear window.

The general purpose of the present invention, which will be described subsequently in greater detail, is to provide a new rear window screen assembly for trucks apparatus and method which has many of the advantages of the window screens mentioned heretofore and many novel features that result in a new rear window screen assembly for trucks which is not anticipated, rendered obvious, suggested, or even implied by any of the prior art window screens, either alone or in any combination thereof.

To attain this, the present invention generally comprises a mesh screen with a frame and at least one spring member coupled to a lower edge of the frame. Each spring member is designed for being inserted into a lower track of a window opening such that the spring member urges the frame upward. An upper edge of the frame is designed for insertion into an upper track of the window opening whereby said frame is couplable to the window opening.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new rear window screen assembly for trucks apparatus and method which has many of the advantages of the window screens mentioned heretofore and many novel features that result in a new rear window screen assembly for trucks which is not anticipated, rendered obvious, suggested, or even implied by any of the prior art window screens, either alone or in any combination thereof.

It is another object of the present invention to provide a new rear window screen assembly for trucks which may be easily and efficiently manufactured and marketed.

It is a further object of the present invention to provide a new rear window screen assembly for trucks which is of a durable and reliable construction.

An even further object of the present invention is to provide a new rear window screen assembly for trucks which is susceptible of a low cost of manufacture with regard to both materials and labor, and which accordingly is then susceptible of low prices of sale to the consuming public, thereby making such rear window screen assembly for trucks economically available to the buying public.

Still yet another object of the present invention is to provide a new rear window screen assembly for trucks which provides in the apparatuses and methods of the prior art some of the advantages thereof, while simultaneously overcoming some of the disadvantages normally associated therewith.

Still another object of the present invention is to provide a new rear window screen assembly for trucks for preventing debris from entering through an open rear window.

Yet another object of the present invention is to provide a new rear window screen assembly for trucks which includes a mesh screen with a frame and at least one spring member coupled to a lower edge of the frame. Each spring member is designed for being inserted into a lower track of a window opening such that the spring member urges the frame upward. An upper edge of the frame is designed for insertion into an upper track of the window opening whereby said frame is couplable to the window opening.

Still yet another object of the present invention is to provide a new rear window screen assembly for trucks that prevents rain from entering through the window.

Even still another object of the present invention is to provide a new rear window screen assembly for trucks that is easy to install and operate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic front view of a new rear window screen assembly for trucks according to the present invention.

FIG. 2 is a schematic cross-sectional front view of a spring assembly of the present invention.

FIG. 3 is a schematic cross-sectional side view of the present invention inserted in the upper and lower tracks of the window opening.

FIG. 4 is a schematic front view of the present invention, illustrating how the rear window screen assembly slides in the upper and lower tracks.

FIG. 5 is a schematic perspective view of the present invention, illustrating how a logo can placed on the mesh screen.

FIG. 6 is a schematic perspective view of the present invention, illustrating the visor.

DESCRIPTION OF THE PREFERRED EMBODIMENT

With reference now to the drawings, and in particular to FIGS. 1 through 6 thereof, a new rear window screen assembly for trucks embodying the principles and concepts of the present invention and generally designated by the reference numeral 10 will be described.

As best illustrated in FIGS. 1 through 6, the rear window screen assembly for trucks 10 with a rear window opening 11 having an upper track 12 and a lower track 13 generally comprises a mesh screen 14 for permitting air flow through the mesh screen 14.

A frame 15 surrounds the mesh screen 14. The frame 15 includes at least one spring member 16 coupled to a lower edge 17 of the frame 15. Each spring member 16 is designed for being inserted into the lower track 13 of the window opening 11 such that the spring member 16 urges the frame 15 upward. An upper edge 18 of the frame 15 is designed for insertion into the upper track 12 of the window opening 11 whereby the frame is couplable to the window opening 11.

Each of the spring members 16 have opposite ends 20 and an arcuate medial portion 21 extending between the opposite ends 20. The frame 15 includes a plurality of spring cavities 22. Each spring cavity 22 has a first portion 23 that extends inward from an outer edge 24 of the frame 15 and a second portion 25 that extends orthogonally from an interior end 26 of the first portion 23. Each of the opposite ends 20 of each of the spring members 16 are positionable in an associated one of the second portions 25 of the spring cavities 22, whereby the medial portion 21 of the spring member 16 is biased outwardly from the frame 15.

The frame 15 includes at least one depression 19 designed for receiving a fingertip therein for facilitating grasping of the frame for sliding the frame 15 in the window opening 11. Each depression 19 extends inward from an associated interior side edge 27 of the frame 15.

A visor 28 is coupled to the frame 15 for preventing water from entering the vehicle 29 through the mesh screen 14 when the frame 15 is positioned in the window opening 11. The visor 28 is pivotally coupled to the frame 15. The visor 28 pivots between an extended position 29 defined by when the visor 28 is extending orthogonally from the frame 15 and a retracted position 30 defined by when the visor 28 is positioned in a substantially parallel position with respect to the frame 15.

The frame has at least one biasing spring 35 that is coupled to the visor 28 for holding the visor in the extended position 29 when the visor 28 is placed in the extended position 29. The visor 28 has an outer visor frame member 31. The outer visor frame member 31 encases a transparent shield member 32.

A pair of resilient sealing members 33 extend along a length of an associated outside side edge 34 of the frame 15 such that each outside side edge 34 is designed for abutting an associated edge of the window opening 11.

The mesh screen 14 may have a picture or logo indicia displayed thereon.

In use, the upper edge 18 of the frame 15 is inserted in the upper track 12 of the window opening 11. Each spring member 16 is then pressed in and the frame 15 is then inserted in the lower track 13. The window screen assembly 10 may then be slid in the upper track 12 and the lower track 13 to cover the window opening 11. If it is raining the visor 28 may be placed in the extended position 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A window screen assembly for coupling in an opening of a sliding window of a vehicle, the window opening having an upper track and a lower track, said window screen assembly comprising:
  a mesh screen for permitting air flow through said mesh screen;
  a frame surrounding said mesh screen;
  at least one spring member coupled to a lower edge of said frame, each said spring member being adapted for being inserted into the lower track of the window opening such that the spring member urges said frame upwardly, an upper edge of said frame being adapted for insertion into the upper track of the window opening whereby said frame is couplable to the window opening;
  two of said spring members, each of said spring members having opposite ends and an arcuate medial portion extending between said opposite ends;
  said frame including a plurality of spring cavities, each spring cavity having a first portion extending inwardly from an outer edge of said frame and a second portion extending orthogonally from an interior end of said first portion; and
  each of said opposite ends of each of said spring members being positionable in an associated one of said second portions of said spring cavities whereby said medial portion of said spring member is biased outwardly from said frame.

2. The window screen assembly of claim 1, further comprising:
  said frame including at least one depression adapted for receiving a fingertip therein for facilitating grasping of said frame for sliding said frame in the window opening.

3. The window screen assembly of claim 2, further comprising:
  said frame including a pair of said depressions, each of said depressions extending inwardly from an associated interior side edge of said frame.

4. The window screen assembly of claim 1, further comprising:
  said mesh screen including a picture displayed on said mesh screen.

5. The window screen assembly of claim 1, further comprising:
  said mesh screen including a logo indicia displayed on said mesh screen.

6. The window screen assembly of claim 1, further comprising:
  a pair of resilient sealing members, each of said sealing members extending along a length of an associated outside side edge of said frame such that each said outside side edge is adapted for abutting an associated edge of said window opening.

7. A window screen assembly for coupling in an opening of a sliding window of a vehicle, the window opening having an upper track and a lower track, said window screen assembly comprising:
  a mesh screen for permitting air flow through said mesh screen;
  a frame surrounding said mesh screen;
  at least one spring member coupled to a lower edge of said frame, each said spring member being adapted for being inserted into the lower track of the window opening such that the spring member urges said frame upwardly, an upper edge of said frame being adapted for insertion into the upper track of the window opening whereby said frame is couplable to the window opening; and
  a visor coupled to said frame for preventing water from entering the vehicle through the mesh screen when the frame is positioned in the window opening.

8. The window screen assembly of claim 7, further comprising:
  said visor being pivotally coupled to said frame, said visor being pivotable between an extended position defined by said visor extending orthogonally from said frame and a retracted position defined by said visor being positioned in a substantially parallel position with respect to said frame.

9. The window screen assembly of claim 8, further comprising:
  at least one biasing spring, said biasing springs being coupled to the frame, said biasing springs also being coupled to the visor for holding the visor in the extended position when the visor is placed in the extended position.

10. The window screen assembly of claim 7, further comprising:
  said visor having an outer visor frame member, said outer visor frame member encasing a transparent shield member.

11. The window screen assembly of claim 7, further comprising:
  said frame including at least one depression adapted for receiving a fingertip therein for facilitating grasping of said frame for sliding said frame in the window opening.

12. The window screen assembly of claim 7, further comprising:
  said frame including a pair of said depressions, each of said depressions extending inwardly from an associated interior side edge of said frame.

13. The window screen assembly of claim 7, further comprising:
  said mesh screen including a picture displayed on said mesh screen.

14. The window screen assembly of claim 7, further comprising:
  said mesh screen including a logo indicia displayed on said mesh screen.

15. The window screen assembly of claim 7, further comprising:
  a pair of resilient sealing members, each o said sealing members extending along a length of an associated outside side edge of said frame such that each said outside side edge is adapted for abutting an associated edge of said window opening.

16. A window screen assembly for coupling in an opening of a sliding window of a vehicle, the window opening having an upper track and a lower track, said window screen assembly comprising:
  a mesh screen for permitting air flow through said mesh screen;
  a frame surrounding said mesh screen;
  at least one spring member coupled to a lower edge of said frame, each said spring member being adapted for being inserted into the lower track of the window opening such that the spring member urges said frame upwardly, an upper edge of said frame being adapted for insertion into the upper track of the window opening whereby said frame is couplable to the window opening;
  said frame including at least a pair of depressions, each of said depressions being adapted for receiving a fingertip therein for facilitating grasping of said frame for sliding said frame in the window opening;

each of said depressions extending inwardly from an associated interior side edge of said frame;

two of said spring members, each of said spring members having opposite ends and an arcuate medial portion extending between said opposite ends;

said frame including a plurality of spring cavities, each spring cavity having a first portion extending inwardly from an outer edge of said frame and a second portion extending orthogonally from an interior end of said first portion;

each of said opposite ends of each of said spring members being positionable in an associated one of said second portions of said spring cavities whereby said medial portion of said spring member is biased outwardly from said frame;

a visor coupled to said frame for preventing water from entering the vehicle through the mesh screen when the frame is positioned in the window opening;

said visor being pivotally coupled to said frame, said visor being pivotable between an extended position defined by said visor extending orthogonally from said frame and a retracted position defined by said visor being positioned in a substantially parallel position with respect to said frame;

a pair of resilient sealing members, each of said sealing members extending along a length of an associated outside side edge of said frame such that each said outside side edge is adapted for abutting an associated edge of said window opening;

at least one biasing spring, said biasing springs being coupled to the frame, said biasing springs also being coupled to the visor for holding the visor in the extended position when the visor is placed in the extended position; and said visor having an outer visor frame member, said outer visor frame member encasing a transparent shield member.

17. The window screen assembly of claim 16, further comprising:

said mesh screen including a picture displayed on said mesh screen.

18. The window screen assembly of claim 16, further comprising:

said mesh screen including a logo indicia displayed on said mesh screen.

\* \* \* \* \*